US012726970B2

(12) United States Patent
Bommakanti et al.

(10) Patent No.: US 12,726,970 B2
(45) Date of Patent: Sep. 1, 2026

(54) TECHNIQUES FOR AVOIDING SOUNDING REFERENCE SIGNAL AND PAGING OCCASION COLLISIONS

(71) Applicant: QUALCOMM Incorporated, San Diego, CA (US)

(72) Inventors: Radhakrishna Madhur Bommakanti, Khammam (IN); Akash Singhal, Kota (IN); Akash Srivastava, Hyderabad (IN); Rajesh Nadava, Hyderabad (IN); Yasharaj Vilas More, Dhule (IN); Sivapavan Kumar Vasa, Palakollu (IN); Sujala Awasthi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 18/783,246

(22) Filed: Jul. 24, 2024

(65) Prior Publication Data

US 2026/0032666 A1 Jan. 29, 2026

(51) Int. Cl.

*H04W 72/12* (2023.01)
*H04L 5/00* (2006.01)
*H04W 68/02* (2009.01)
*H04W 72/0446* (2023.01)

(52) U.S. Cl.

CPC ........... *H04W 72/12* (2013.01); *H04L 5/0048* (2013.01); *H04W 68/02* (2013.01); *H04W 72/0446* (2013.01)

(58) Field of Classification Search

CPC ............................ H04L 5/0048; H04W 68/02; H04W 72/0446; H04W 72/12; H04W 88/06

See application file for complete search history.

(56) References Cited

U.S. PATENT DOCUMENTS 10,966,168 B1 * 3/2021 Krishnamoorthy .......................... H04W 56/001
11,849,421 B2 * 12/2023 Ghosh ................. H04W 60/005
2021/0337590 A1 * 10/2021 Krishnamoorthy ... H04W 68/00
2022/0104001 A1 * 3/2022 Ou ........................ H04W 24/08

(Continued)

OTHER PUBLICATIONS

International Search Report and Written Opinion—PCT/US2025/038164—ISA/EPO—Nov. 11, 2025.

*Primary Examiner* — Eric Nowlin
(74) *Attorney, Agent, or Firm* — Holland & Hart LLP/Qualcomm

(57) ABSTRACT

Methods, systems, and devices for wireless communications are described. Techniques described herein provide for avoiding sounding reference signal (SRS) and paging occasion collisions. In some examples, a user equipment (UE) may receive first control signaling indicating a set of SRS resources associated with a first subscriber identity associated with the UE. The UE may receive second control signaling indicating a first set of paging occasions and a set of synchronization signal block (SSB) occasions associated with a second subscriber identity associated with the UE. A first serving SSB may be associated with one of the SSB occasions. The UE may transmit, in accordance with a scheduling overlap in time between a SRS resource of the set of SRS resources and a paging occasion of the first set of paging occasions, an indication of a transition of the second subscriber identity from the first serving SSB to a second serving SSB.

20 Claims, 10 Drawing Sheets

(56) References Cited

U.S. PATENT DOCUMENTS

| | | | | |
|---|---|---|---|---|
| 2022/0141723 | A1* | 5/2022 | Patankar | H04W 24/02 455/436 |
| 2022/0377702 | A1* | 11/2022 | Chun | H04W 76/30 |
| 2023/0063203 | A1 | 3/2023 | Ravuvari et al. | |
| 2023/0189209 | A1* | 6/2023 | Jung | H04W 76/28 370/329 |
| 2023/0199692 | A1* | 6/2023 | Ghosh | H04L 5/0048 455/435.1 |
| 2024/0098694 | A1* | 3/2024 | Xie | H04W 8/26 |

* cited by examiner 100
110
115
125
105
120
140
RIC 175
CU 160
DU 165
SMO 180
RU 170
168
162
104
155
135
130
150

700

Figure 9:
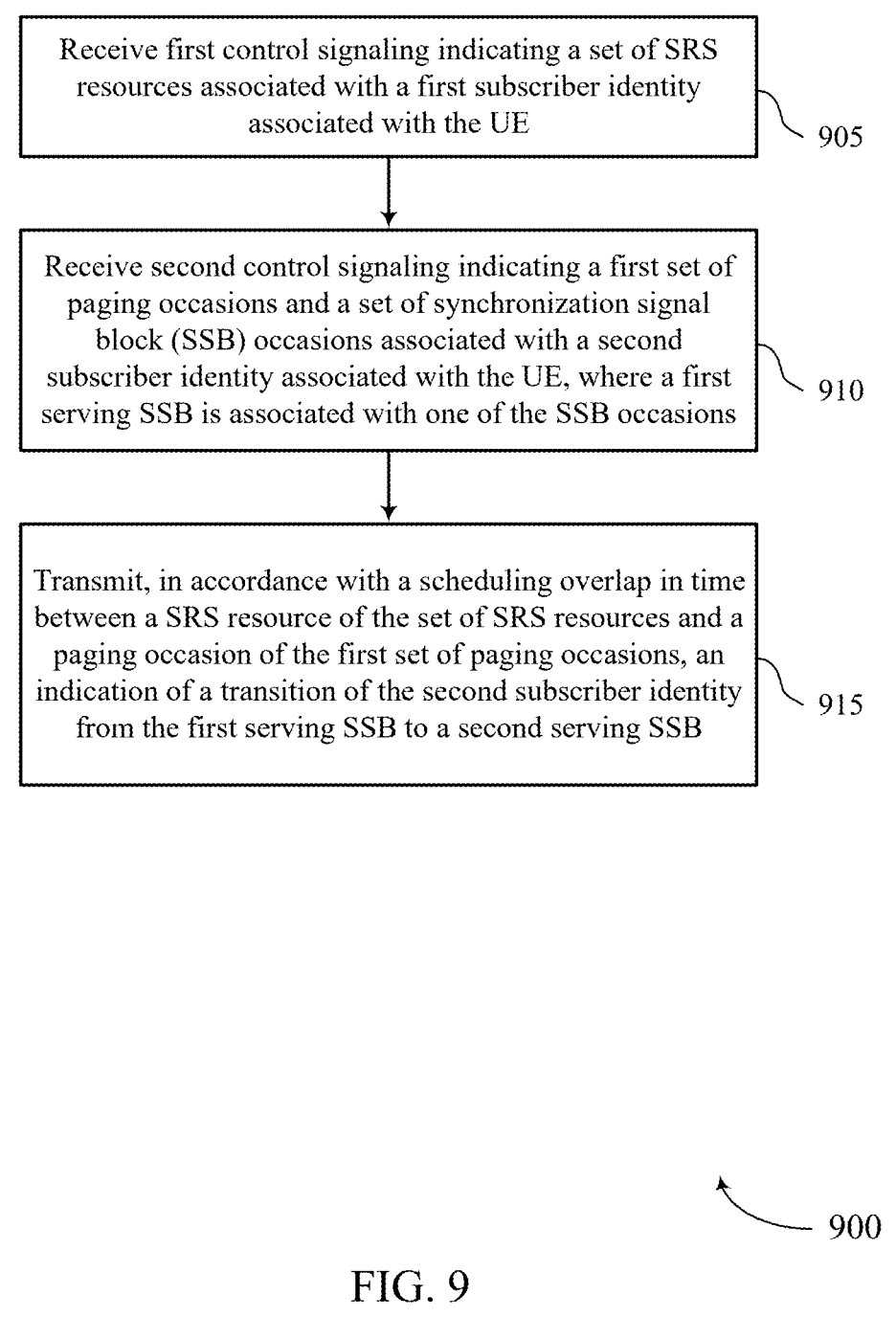

Receive first control signaling indicating a set of SRS resources associated with a first subscriber identity associated with the UE

905

Receive second control signaling indicating a first set of paging occasions and a set of synchronization signal block (SSB) occasions associated with a second subscriber identity associated with the UE, where a first serving SSB is associated with one of the SSB occasions

910

Transmit, in accordance with a scheduling overlap in time between a SRS resource of the set of SRS resources and a paging occasion of the first set of paging occasions, an indication of a transition of the second subscriber identity from the first serving SSB to a second serving SSB

TECHNIQUES FOR AVOIDING SOUNDING REFERENCE SIGNAL AND PAGING OCCASION COLLISIONS

FIELD OF TECHNOLOGY

The following relates to wireless communications, including techniques for avoiding sounding reference signal and paging occasion collisions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communication by a user equipment (UE) is described. The method may include receiving first control signaling indicating a set of sounding reference signal (SRS) resources associated with a first subscriber identity associated with the UE, receiving second control signaling indicating a first set of paging occasions and a set of synchronization signal block (SSB) occasions associated with a second subscriber identity associated with the UE, where a first serving SSB is associated with one of the SSB occasions, and transmitting, in accordance with a scheduling overlap in time between a SRS resource of the set of SRS resources and a paging occasion of the first set of paging occasions, an indication of a transition of the second subscriber identity from the first serving SSB to a second serving SSB.

A UE for wireless communication is described. The UE may include one or more memories storing processor executable code, and one or more processors coupled with the one or more memories. The one or more processors may individually or collectively be operable to execute the code to cause the UE to receive first control signaling indicating a set of SRS resources associated with a first subscriber identity associated with the UE, receive second control signaling indicating a first set of paging occasions and a set of SSB occasions associated with a second subscriber identity associated with the UE, where a first serving SSB is associated with one of the SSB occasions, and transmit, in accordance with a scheduling overlap in time between a SRS resource of the set of SRS resources and a paging occasion of the first set of paging occasions, an indication of a transition of the second subscriber identity from the first serving SSB to a second serving SSB.

Another UE for wireless communication is described. The UE may include means for receiving first control signaling indicating a set of SRS resources associated with a first subscriber identity associated with the UE, means for receiving second control signaling indicating a first set of paging occasions and a set of SSB occasions associated with a second subscriber identity associated with the UE, where a first serving SSB is associated with one of the SSB occasions, and means for transmitting, in accordance with a scheduling overlap in time between a SRS resource of the set of SRS resources and a paging occasion of the first set of paging occasions, an indication of a transition of the second subscriber identity from the first serving SSB to a second serving SSB.

A non-transitory computer-readable medium storing code for wireless communication is described. The code may include instructions executable by one or more processors to receive first control signaling indicating a set of SRS resources associated with a first subscriber identity associated with the UE, receive second control signaling indicating a first set of paging occasions and a set of SSB occasions associated with a second subscriber identity associated with the UE, where a first serving SSB is associated with one of the SSB occasions, and transmit, in accordance with a scheduling overlap in time between a SRS resource of the set of SRS resources and a paging occasion of the first set of paging occasions, an indication of a transition of the second subscriber identity from the first serving SSB to a second serving SSB.

Some examples of the method, user equipment (UEs), and non-transitory computer-readable medium described herein may further include operations, features, means, or instructions for receiving an indication of a second set of paging occasions based on the second serving SSB, where the second set of paging occasions may be different from the first set of paging occasions.

Some examples of the method, user equipment (UEs), and non-transitory computer-readable medium described herein may further include operations, features, means, or instructions for receiving one or more SSBs in accordance with the set of SSB occasions and measuring a received signal power associated with the one or more SSBs, where the indication of the transition of the second subscriber identity from the first serving SSB to the second serving SSB may be based on the received signal power.

In some examples of the method, user equipment (UEs), and non-transitory computer-readable medium described herein, the received signal power includes one or more of a reference signal received power value, a signal to noise ratio, a reference signal received quantity value, or a combination thereof.

In some examples of the method, user equipment (UEs), and non-transitory computer-readable medium described herein, the indication of the transition of the second subscriber identity from the first serving SSB to the second serving SSB may be based on the received signal power satisfying a threshold.

Some examples of the method, user equipment (UEs), and non-transitory computer-readable medium described herein may further include operations, features, means, or instructions for obtaining, from a first wireless modem associated with the first subscriber identity, an indication of the set of SRS resources in accordance with the first control signaling, obtaining, from a second wireless modem associated with the second subscriber identity, an indication of the first set of paging occasions and the received signal power associated with the one or more SSBs, and outputting, to the second wireless modem, an index associated with the second serving SSB to trigger the transition of the second subscriber identity from the first SSB to the second SSB.

Some examples of the method, user equipment (UEs), and non-transitory computer-readable medium described herein may further include operations, features, means, or instructions for receiving one or more SRSs in accordance with the set of SRS resources and receiving one or more paging messages in accordance with the second set of paging occasions, where the one or more paging messages may be non-overlapping in time with the one or more SRSs.

In some examples of the method, user equipment (UEs), and non-transitory computer-readable medium described herein, the first subscriber identity includes a dedicated data subscription of the UE, and the second subscriber identity includes a non-dedicated data subscription service of the UE.

In some examples of the method, user equipment (UEs), and non-transitory computer-readable medium described herein, the first subscriber identity may be associated with a connected state, and the second subscriber identity may be associated with an idle state.

In some examples of the method, user equipment (UEs), and non-transitory computer-readable medium described herein, the indication of the transition of the second subscriber identity from the first serving SSB to a second serving SSB includes one or more of a random access message to the network entity in accordance with the second serving SSB, a control message explicitly identifying the second serving SSB, or a combination thereof.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 9 and 10 show flowcharts illustrating methods that support techniques for avoiding SRS and paging occasion collisions in accordance with one or more aspects of the present disclosure.

DETAILED DESCRIPTION

Some user equipments (UEs) may be equipped with two subscriber identify modules (SIMs) which may allow the UE to communicate via multiple different services and provide enhanced capability and throughput. For example, a first SIM (such as a dedicated data subscription (DDS)) SIM may be configured to periodically receive a set of sounding reference signals (SRSs), and a second SIM (such as a non-dedicated data subscription (nDDS)) SIM may be configured to periodically receive a set of paging occasions. In some cases, however, the resources for receiving one or more SRSs and the one or more paging occasions may overlap or collide in time, which may significantly reduce throughput for the multi-SIM UE.

The multi-SIM UE may identify an overlap or collision in time between SRS resources and paging occasions occurring on different SIMs of the UE, and the UE may transmit an indication to change a serving synchronization signal block (SSB) to move the paging occasions. In some examples, the UE may include a first SIM including a DDS of the UE and a second SIM including a nDDS service. The first SIM may be in a connected state, and the second SIM may be in an idle state. The UE may receive first control signaling indicating a set of SRS resources associated with the first SIM. The UE may receive second control signaling indicating a first set of paging occasions and a set of SSB occasions associated with the second SIM. A first serving SSB may be associated with one of the SSB occasions. The UE may transmit, in accordance with a scheduling overlap or collision in time between a SRS resource and a paging occasion of the first set of paging occasions, an indication of a transition of the second SIM from the first serving SSB to a second serving SSB. The UE may receive a second set of paging occasions based on the second serving SSB. The UE may receive SRSs over the set of SRS resources and may receive paging messages in accordance with the second set of paging occasions. The paging messages may be non-colliding or non-overlapping with the SRSs.

Aspects of the disclosure are initially described in the context of wireless communications systems. Aspects of the disclosure are also described in context of a flow diagram and a process flow. Aspects of the disclosure are further illustrated by and described with reference to apparatus diagrams, system diagrams, and flowcharts that relate to techniques for avoiding SRS and paging occasion collisions.

Figure 1:
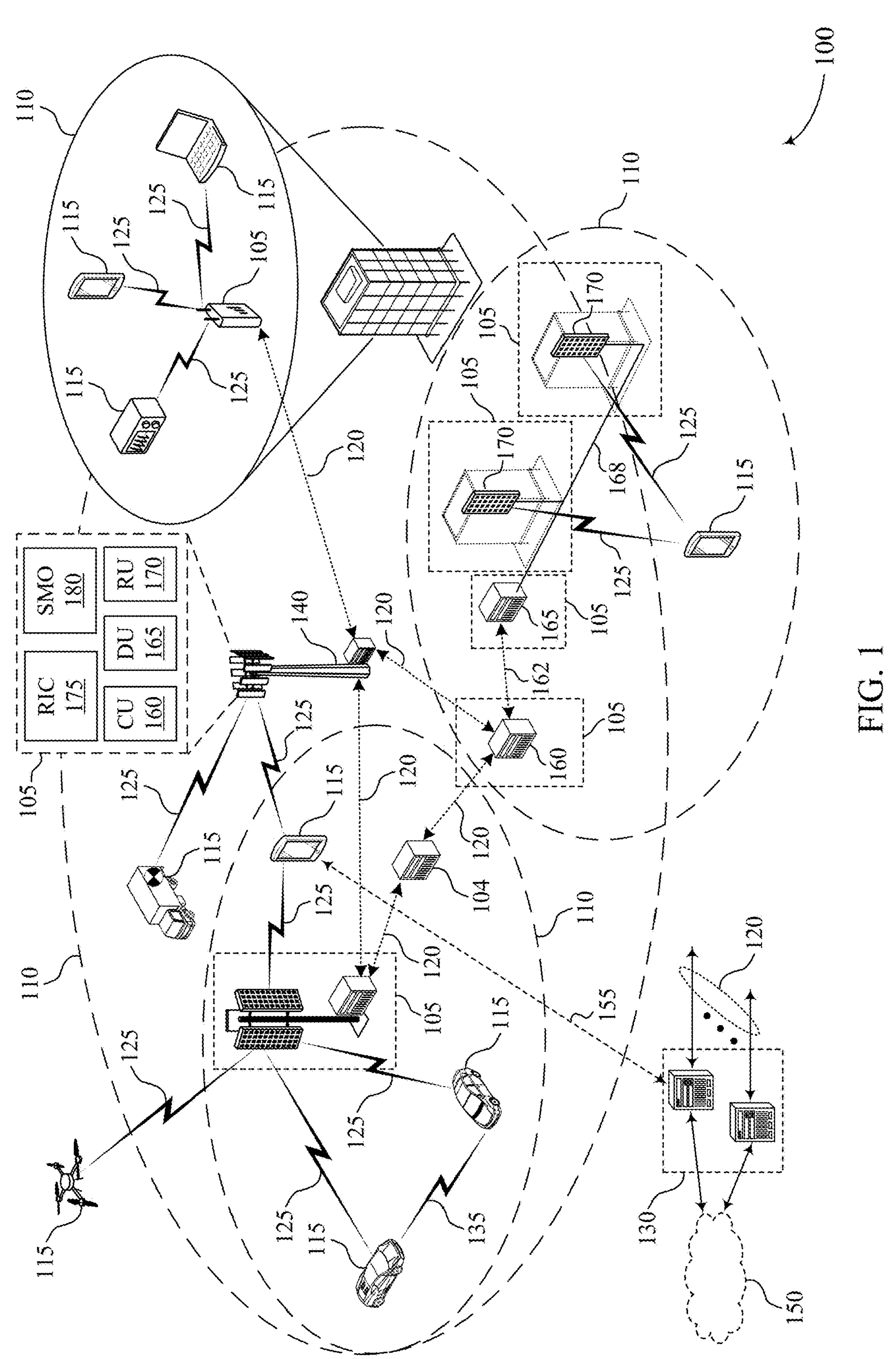
FIG. 1 shows an example of a wireless communications system that supports techniques for avoiding sounding reference signal (SRS) and paging occasion collisions in accordance with one or more aspects of the present disclosure.

FIG. 1 shows an example of a wireless communications system 100 that supports techniques for avoiding SRS and paging occasion collisions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 may be equipped with two SIMs which may allow the UE 115 to communicate via multiple different services and provide enhanced capability and throughput. For example, a first SIM (such as a DDS) may be configured to periodically receive a set of SRSs, and a second SIM (such as a nDDS) may be configured to periodically receive a set of paging occasions. In some cases, however, the resources for receiving one or more SRSs and the one or more paging occasions may overlap or collide in time, which may significantly reduce throughput for the multi-SIM UE 115.

The multi-SIM UE 115 may identify an overlap or collision in time between SRS resources and paging occasions occurring on different SIMs of the UE 115, and the UE 115 may transmit an indication to change a serving SSB to move the paging occasions. In some examples, the UE 115 may include a first SIM including a DDS of the UE 115 and a second SIM including a nDDS. The first SIM may be in a connected state, and the second SIM may be in an idle state. The UE 115 may receive first control signaling indicating a set of SRS resources associated with the first SIM. The UE 115 may receive second control signaling indicating a first set of paging occasions and a set of SSB occasions associated with the second SIM. A first serving SSB may be associated with one of the SSB occasions. The UE 115 may transmit, in accordance with a scheduling overlap or collision in time between a SRS resource and a paging occasion of the first set of paging occasions, an indication of a transition of the second SIM from the first serving SSB to a second serving SSB. The UE 115 may receive a second set of paging occasions based on the second serving SSB. The UE 115 may receive SRSs over the set of SRS resources and may receive paging messages in accordance with the second set of paging occasions. The paging messages are non-colliding or non-overlapping with the SRSs.

Figure 2:
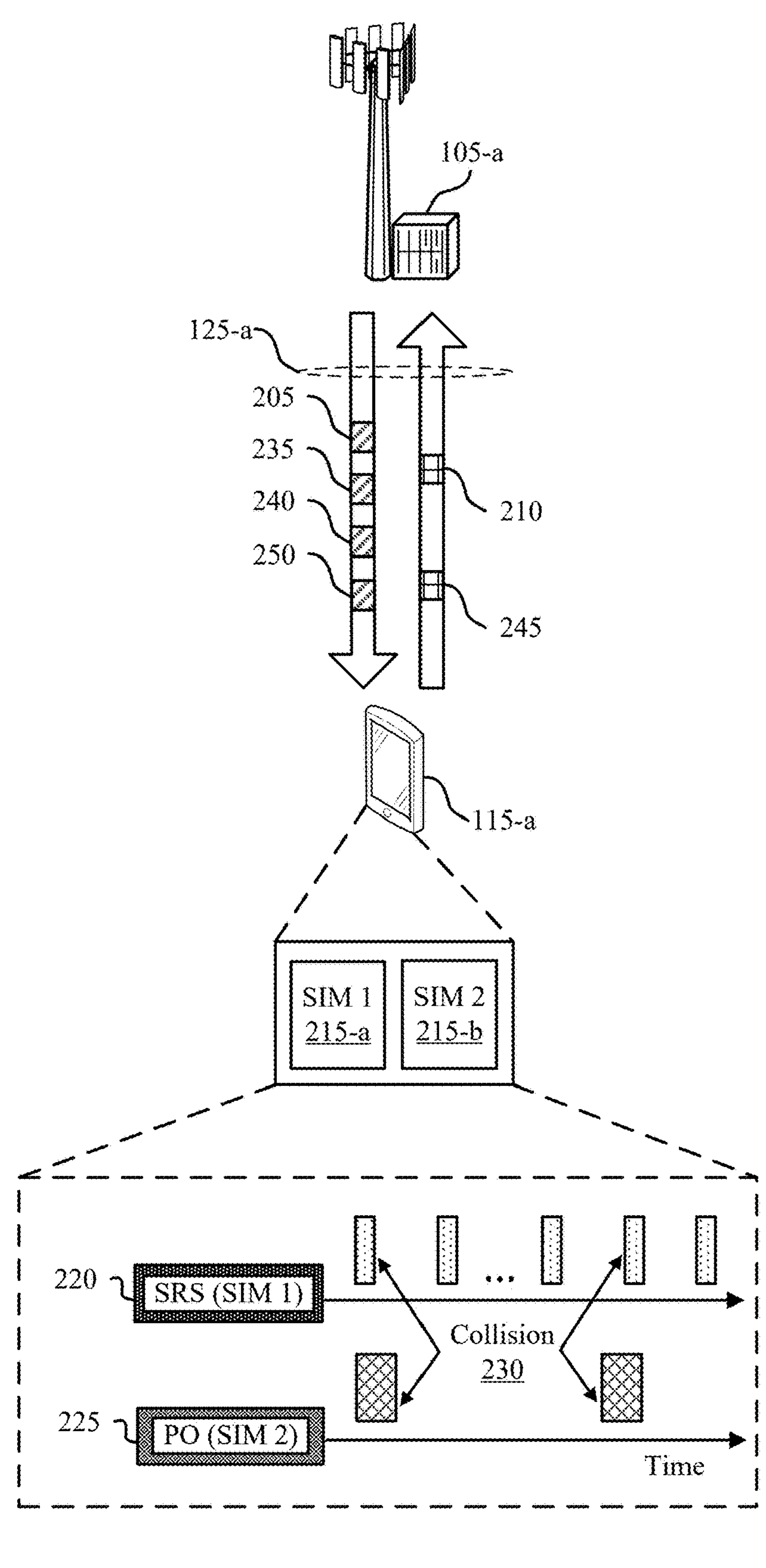
FIG. 2 shows an example of a wireless communications system that supports techniques for avoiding SRS and paging occasion collisions in accordance with one or more aspects of the present disclosure.

FIG. 2 shows an example of a wireless communications system 200 that supports techniques for avoiding SRS and paging occasion collisions in accordance with one or more aspects of the present disclosure. The wireless communications system 200 may implement aspects of or may be implemented by aspects of the wireless communications system 100. For example, the wireless communications system 200 includes a UE 115-*a*, which may be an example of a UE 115 as described herein. The wireless communications system 200 may also include a network entity 105-*a*, which may be an example of a network entity 105 as described herein.

The UE 115-*a* may communicate with the network entity 105-*a* using a communication link 125-*a*. The communication link 125-*a* may be an example of a 6th generation (6G), a NR or LTE link between the UE 115-*a* and the network entity 105-*a*. The communication link 125-*a* may include bi-directional links that enable both uplink and downlink communications. For example, the network entity 105-*a* may transmit downlink signals (e.g., downlink transmission 205), such as downlink control signaling and downlink data signals, to the UE 115-*a* using the communication link 125-*a*, and the UE 115-*a* may transmit uplink signals (e.g., uplink transmission 210), including uplink control signaling and uplink data signals to the network entity 105-*a* using the communication link 125-*a*.

The UE 115-*a* with two or more SIMs (e.g., first SIM 215-*a* and second SIM 215-*b*) which may allow the UE 115 to communicate via multiple different services and provide enhanced capability and throughput. A first SIM 215-*a* (such as a DDS subscriber) may be configured to periodically receive a set of SRSs on SRS resources 220, and a second SIM 215-*b* (such as an nDDS) may be configured to with a set of paging occasions 225. For example, the UE 115-*a* may receive control signaling 235 indicating a set of SRS resources associated with the first SIM 215-*a*. The UE 115-*a* may receive control signaling 240 indicating a set of paging occasions and a set of SSB occasions associated with the second SIM 215-*b*.

In some cases, the UE 115-*a* may actively communicate with a first system using the first SIM 215-*a* while periodically monitoring another system (e.g., synchronizing, reading a paging channel or other system information, and performing measurements in an idle, an inactive state or a NR standalone (SA) mode using the second SIM 215-*b*. In some cases, the UE 115-*a* may be in a connected state (e.g., RRC connected) with the network entity 105-*a*, and may communicate SRS using multiple antennas for the first SIM 215-*a* (e.g., DDS subscriber). In some cases, one or more of the SRS resources 220 for receiving the SRSs and one or more of the paging occasions 225 may overlap or collide in time (e.g., collision 230). Due to the collision, the UE 115-*a* may not transmit SRS which may impact rank and modulation and coding scheme (MCS) of downlink data transmissions, which may significantly reduce throughput for the multi-SIM UE 115.

In some cases, a paging occasion may change by one physically downlink control channel (PDCCH) monitoring occasion, such as one slot, when a serving SSB is changed by one in the idle state. For example, a paging occasion may be a set of 'S' consecutive PDCCH monitoring occasions where 'S' is the quantity of actual transmitted SSBs, and the $K^{th}$ PDCCH monitoring occasion for paging in the paging occasion corresponds to the $K^{th}$ transmitted SSB. An example SSB and paging occasion mapping for a configuration may be SSB slot 0 mapping to paging occasion slot 9, SSB slot 1 mapping to paging occasion slot 10, SSB slot 2 mapping to paging occasion slot 11, SSB slot 3 mapping to paging occasion slot 12, SSB slot 4 mapping to paging occasion slot 13, SSB slot 5 mapping to paging occasion slot 14, SSB slot 6 mapping to paging occasion slot 15, and SSB slot 7 mapping to paging occasion slot 16. When the serving SSB changes from slot 0 to slot 1, the paging occasion slot changes by one from slot 10 to slot 11.

In some examples, the UE 115-*a* may detect the DDS subscriber SRS resources or ports colliding with the nDDS subscriber paging occasion, and the UE 115-*a* may check whether to shift the paging occasions by a few slots by changing the serving SSB of the nDDS subscriber to avoid the collision between the SRS resource and the paging occasion. In some cases, the UE 115-*a* may move to the new serving SSB if the received signal power associated with the SSB satisfies a threshold. Satisfying the threshold received signal power, such as a reference signal received power value (RSRP, a signal to noise ratio (SNR), a reference signal received quantity value, may ensure that the UE 115-*a* does not experience a page decode or random access failure problems on the nDDS subscriber. For example, the UE 115-*a* may transmit an indication 245 to change to the new serving SSB. For example, the indication to change to the new serving SSB may be a random access message to the network entity 105-*a* in accordance with the second serving SSB, a control message explicitly identifying the second serving SSB, or a combination thereof. Based on changing to the new serving SSB, the UE 115-*a* may receive control signaling 250 with a new set of paging occasions based on the new serving SSB.

Figure 3:
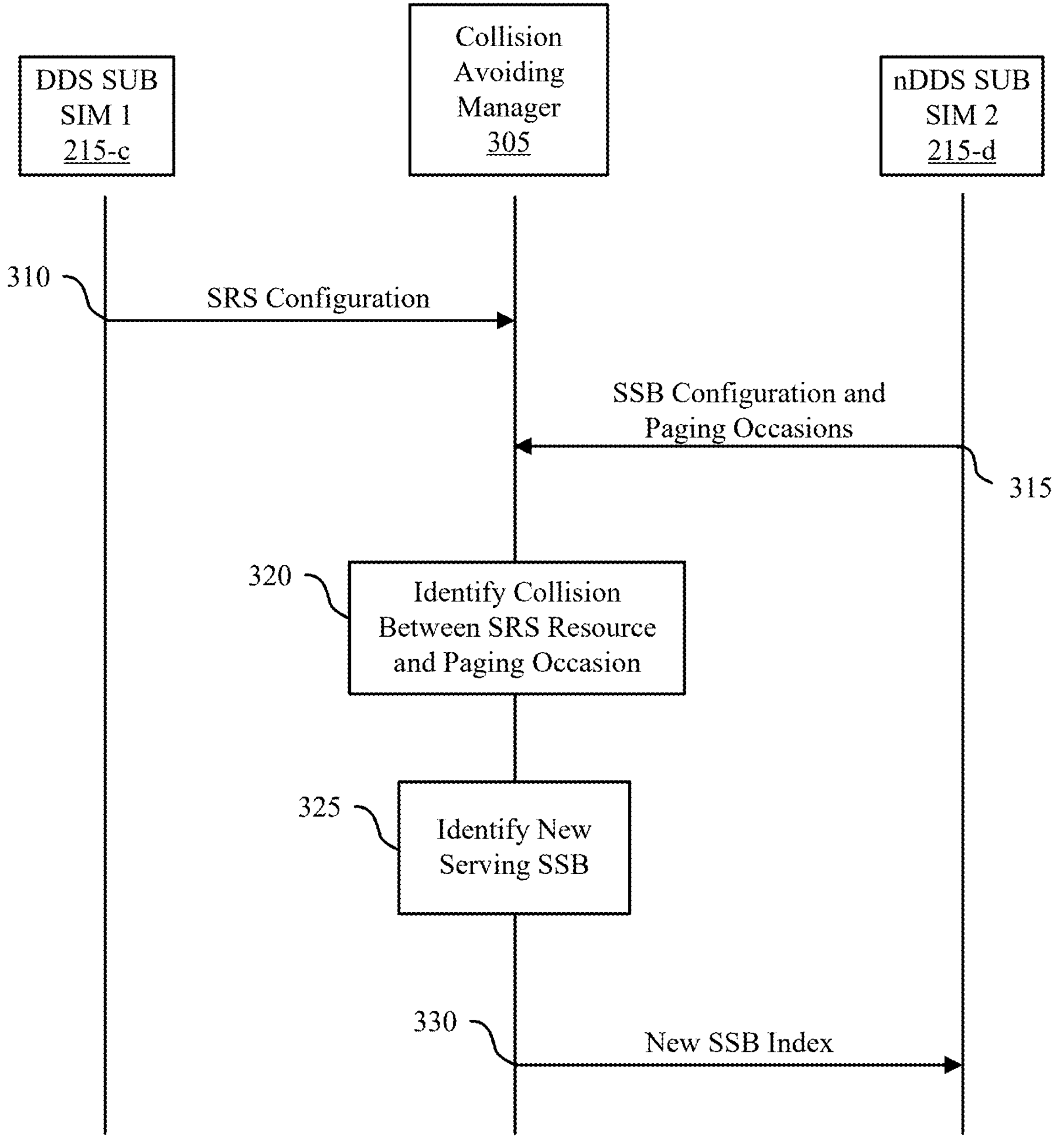
FIG. 3 shows an example of a flow diagram that supports techniques for avoiding SRS and paging occasion collisions in accordance with one or more aspects of the present disclosure.

FIG. 3 shows an example of a flow diagram 300 that supports techniques for avoiding SRS and paging occasion collisions in accordance with one or more aspects of the present disclosure. Aspects of the flow diagram 300 may implement, or be implemented by, aspects of wireless communications system 100 and the wireless communications system 200, or any combination thereof. For example, the flow diagram 300 may be implemented by the UE 115-*a*, which may be an example of the UEs 115 as described with reference to FIGS. 1 and 2. The UE 115-*a* may include two or more SIMs (e.g., SIM 215-*c* and SIM 215-*d*).

In some examples, the UE 115-*a* may include a collision avoidance manager 305. The collision avoidance manager 305 may identify whether the set of SRS resources of the DDS subscriber (e.g., SIM 215-*c*) overlap in time with the set of paging occasions of the nDDS subscriber (e.g., SIM 215-*d*). If the collision avoidance manager 305 identifies the overlap, the collision avoidance manager 305 may identify a new serving SSB to avoid the overlap between the SRS resources and the paging occasions.

At 310, the DDS subscriber (e.g., SIM 215-*c*) may share the SRS configuration of the SRS resources with the collision avoidance manager 305. At 315, the nDDS subscriber (e.g., SIM 215-*d*) may share the SSB configuration and the set of paging occasions with the collision avoidance manager 305. In some cases, the nDDS subscriber (e.g., SIM 215-*d*) may share the SSB configuration and the measured received signal power (e.g., RSRP and SNR values) associated with the SSBs.

At 320, the collision avoidance manager 305 may identify whether the set of SRS resources of the DDS subscriber (e.g., SIM 215-*c*) overlap in time with the set of paging occasions of the nDDS subscriber (e.g., SIM 215-*d*). If the collision exists been at least one of the SRS resources and at least one of the paging occasions, at 325, the collision avoidance manager 305 may identify a new serving SSB to avoid the overlap between the SRS resource(s) and the paging occasion(s). In some cases, the collision avoidance manager 305 may evaluate the received signal power associated with the SSBs, and the collision avoidance manager 305 may select the new serving SSB if the received signal power associated with the candidate SSB satisfies a threshold. At 330, the collision avoidance manager 305 may share a new SSB index with the nDDS subscriber (e.g., SIM 215-*d*).

Figure 4:
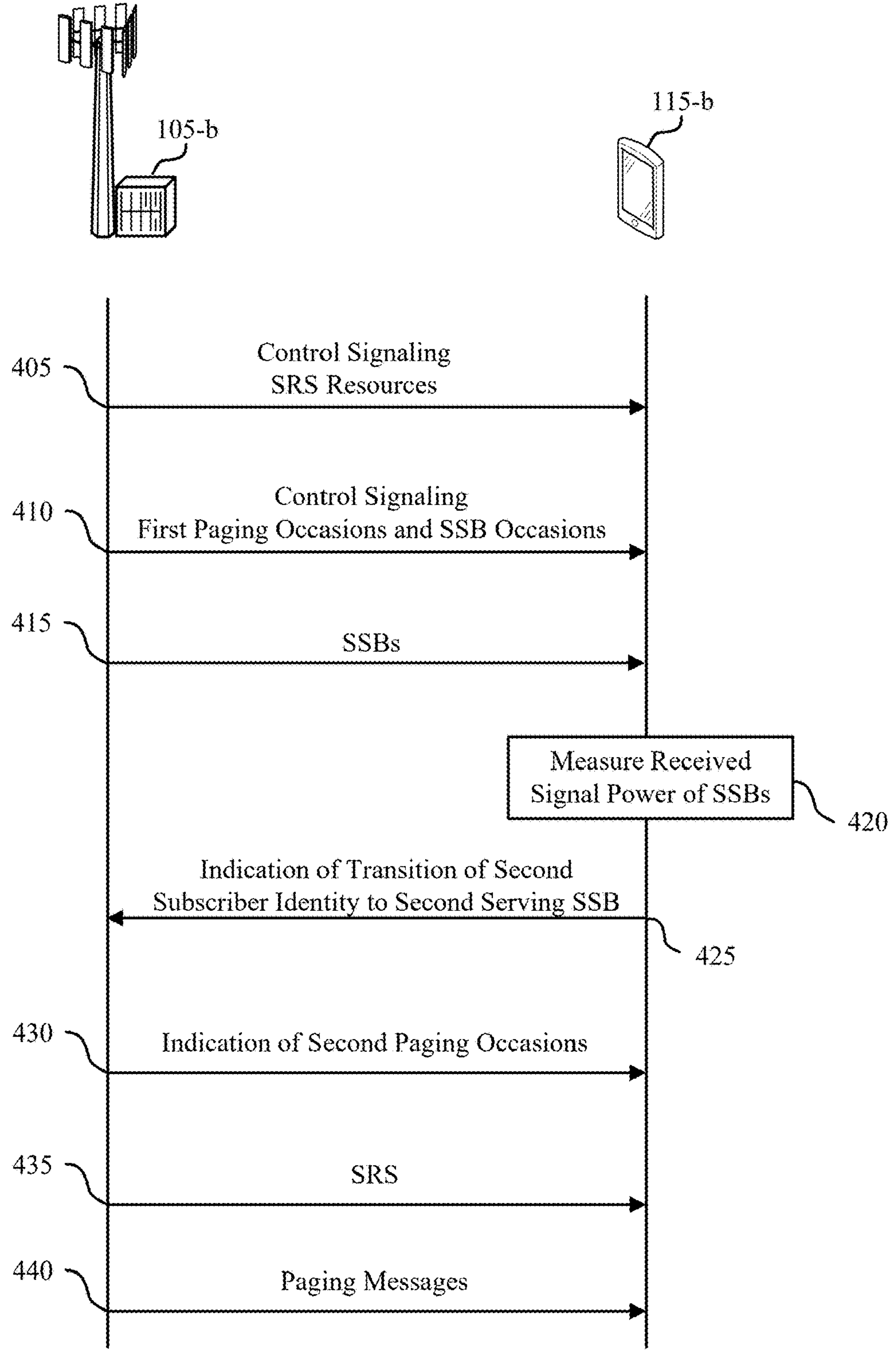
FIG. 4 shows an example of a process flow that supports techniques for avoiding SRS and paging occasion collisions in accordance with one or more aspects of the present disclosure.

FIG. 4 shows an example of a process flow 400 that supports techniques for avoiding SRS and paging occasion collisions in accordance with one or more aspects of the present disclosure. In some examples, the process flow 400 may implement or be implemented by aspects of the wireless communications systems 100 and 200 as described with reference to FIGS. 1 and 2, respectively. For example, the process flow 400 may be implemented by a network entity 105-*b*, which may be an example of the network entities 105 as described with reference to FIGS. 1 and 2. The process flow 400 may be implemented by a UE 115-*b*, which may be an example of the UEs as described with reference to FIGS. 1 and 2.

In some examples, the operations illustrated in process flow 400 may be performed by hardware (e.g., including circuitry, processing blocks, logic components, and other components), code (e.g., software executed by a processor), or any combination thereof. Alternative examples of the following may be implemented, where some steps are performed in a different order than described or are not performed at all. In some cases, steps may include additional features not mentioned below, or further steps may be added.

At 405, the UE 115-*b* may receive first control signaling indicating a set of SRS resources associated with a first subscriber identity associated with the UE 115-*b*. In some examples, the first subscriber identity may be a DDS of the UE 115-*b*. In some examples, the first subscriber identity may be associated with a connected state.

At 410, the UE 115-*b* may receive second control signaling indicating a first set of paging occasions and a set of SSB occasions associated with a second subscriber identity associated with the UE 115-*b*. A first serving SSB may be associated with one of the SSB occasions. In some examples, the second subscriber identity may be a nDDS of the UE 115-*b*. In some examples, the second subscriber identity may be associated with an idle state.

At 415, the UE 115-*b* may receive one or more SSBs in accordance with the set of SSB occasions.

At 420, the UE 115-*b* may measure a received signal power associated with the one or more SSBs. In some examples, the received signal power may include one or more of: a RSRP value, a SNR, a reference signal received quantity value, or a combination thereof.

At 425, the UE 115-*b* may transmit, in accordance with a scheduling overlap in time between a SRS resource of the set of SRS resources and a paging occasion of the first set of paging occasions, an indication of a transition of the second subscriber identity from the first serving SSB to a second serving SSB. In some examples, the indication of the transition of the second subscriber identity from the first serving SSB to the second serving SSB is based at least in part on the measured received signal power. In some examples, the indication of the transition of the second subscriber identity from the first serving SSB to the second serving SSB is based at least in part on the received signal power satisfying a threshold. In some examples, the indication of the transition of the second subscriber identity from the first serving SSB to a second serving SSB includes one or more of: a random access message to the network entity in accordance with the second serving SSB, a control message explicitly identifying the second serving SSB, or a combination thereof.

In some examples, the UE 115-*b* may obtain, from a first wireless modem associated with the first subscriber identity, an indication of the set of SRS resources in accordance with the first control signaling. The UE 115-*b* may obtain, from a second wireless modem associated with the second subscriber identity, an indication of the first set of paging occasions and the received signal power associated with the one or more SSBs. The UE 115-*b* may output, to the second wireless modem, an index associated with the second serving SSB to trigger the transition of the second subscriber identity from the first SSB to the second SSB.

At 430, the UE 115-*b* may receive an indication of a second set of paging occasions based at least in part on the second serving SSB, and the second set of paging occasions may be different from the first set of paging occasions.

At 435, the UE 115-*b* may receive one or more SRSs in accordance with the set of SRS resources.

At 440, the UE 115-*b* may receive one or more paging messages in accordance with the second set of paging occasions, and the one or more paging messages may be non-overlapping in time with the one or more SRSs.

Figure 5:
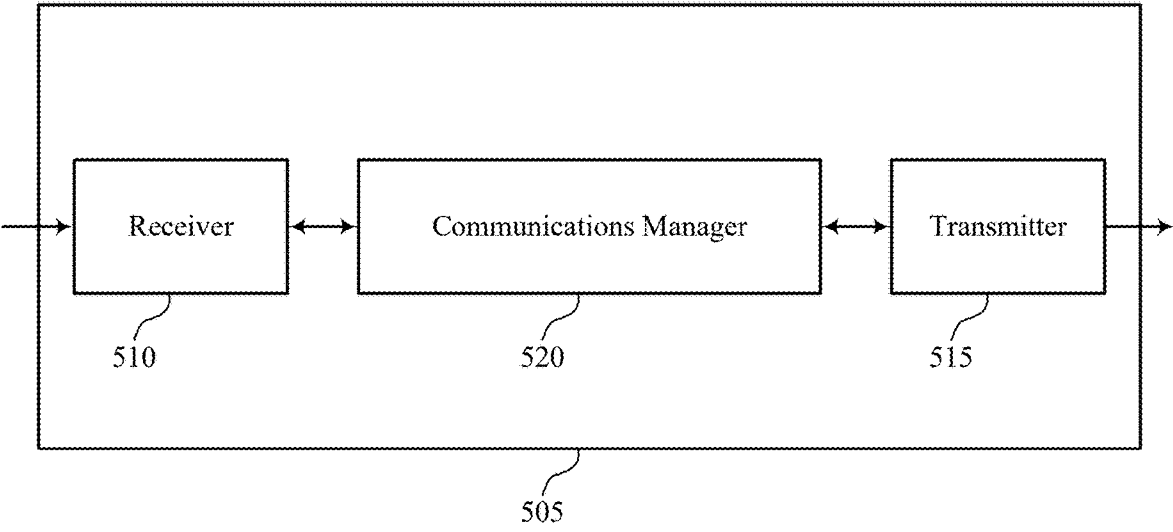
FIGS. 5 and 6 show block diagrams of devices that support techniques for avoiding SRS and paging occasion collisions in accordance with one or more aspects of the present disclosure.

FIG. 5 shows a block diagram 500 of a device 505 that supports techniques for avoiding SRS and paging occasion collisions in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for avoiding SRS and paging occasion collisions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for avoiding SRS and paging occasion collisions). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of techniques for avoiding SRS and paging occasion collisions as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving first control signaling indicating a set of SRS resources associated with a first subscriber identity associated with the UE. The communications manager 520 is capable of, configured to, or operable to support a means for receiving second control signaling indicating a first set of paging occasions and a set of SSB occasions associated with a second subscriber identity associated with the UE, where a first serving SSB is associated with one of the SSB occasions. The communications manager 520 is capable of, configured to, or operable to support a means for transmitting, in accordance with a scheduling overlap in time between a SRS resource of the set of SRS resources and a paging occasion of the first set of paging occasions, an indication of a transition of the second subscriber identity from the first serving SSB to a second serving SSB.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
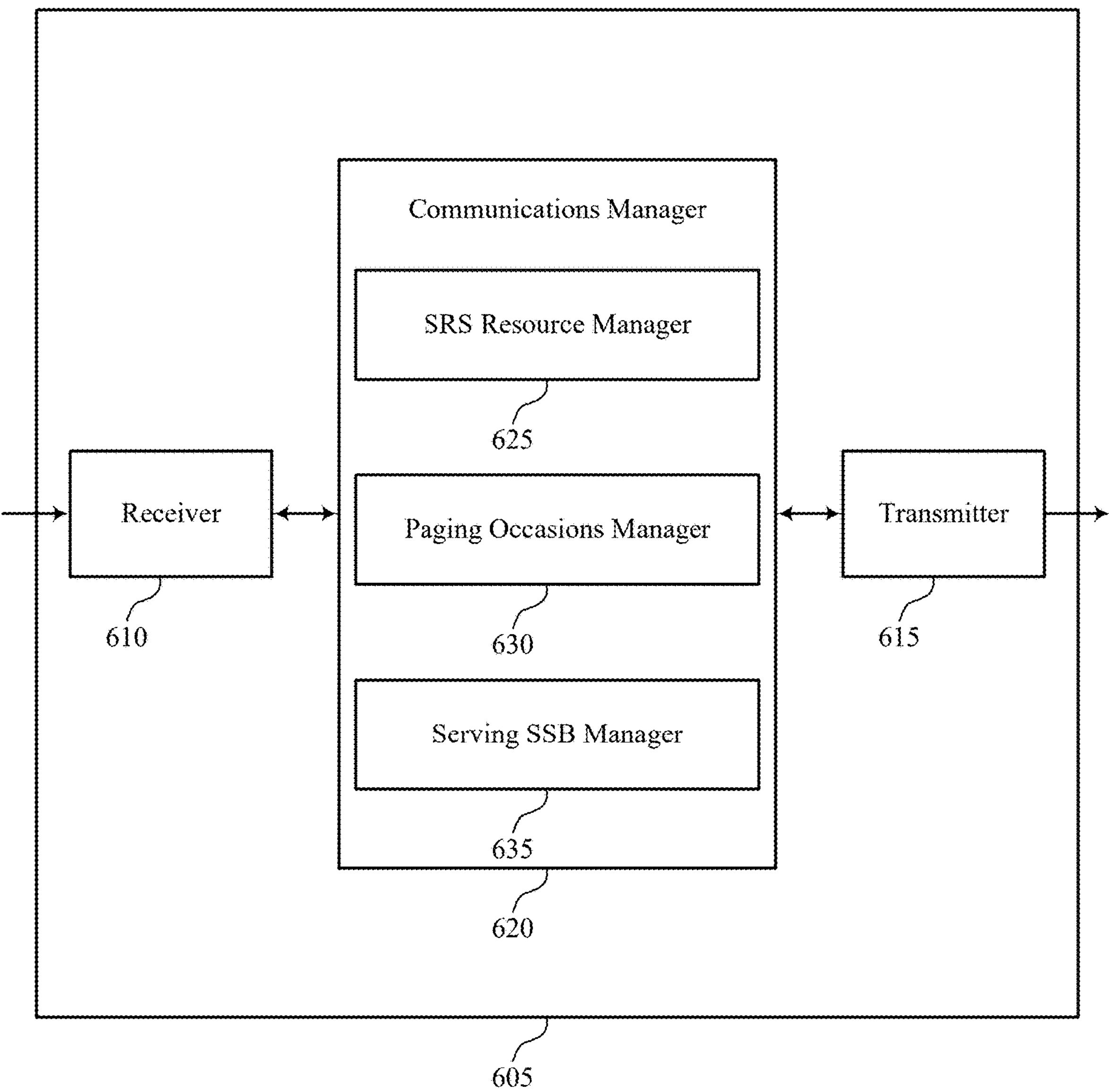

FIG. 6 shows a block diagram 600 of a device 605 that supports techniques for avoiding SRS and paging occasion collisions in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for avoiding SRS and paging occasion collisions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for avoiding SRS and paging occasion collisions). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for avoiding SRS and paging occasion collisions as described herein. For example, the communications manager 620 may include an SRS resource manager 625, a paging occasions manager 630, a serving SSB manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The SRS resource manager 625 is capable of, configured to, or operable to support a means for receiving first control signaling indicating a set of SRS resources associated with a first subscriber identity associated with the UE. The paging occasions manager 630 is capable of, configured to, or operable to support a means for receiving second control signaling indicating a first set of paging occasions and a set of SSB occasions associated with a second subscriber identity associated with the UE, where a first serving SSB is associated with one of the SSB occasions. The serving SSB manager 635 is capable of, configured to, or operable to support a means for transmitting, in accordance with a scheduling overlap in time between a SRS resource of the set of SRS resources and a paging occasion of the first set of paging occasions, an indication of a transition of the second subscriber identity from the first serving SSB to a second serving SSB.

Figure 7:
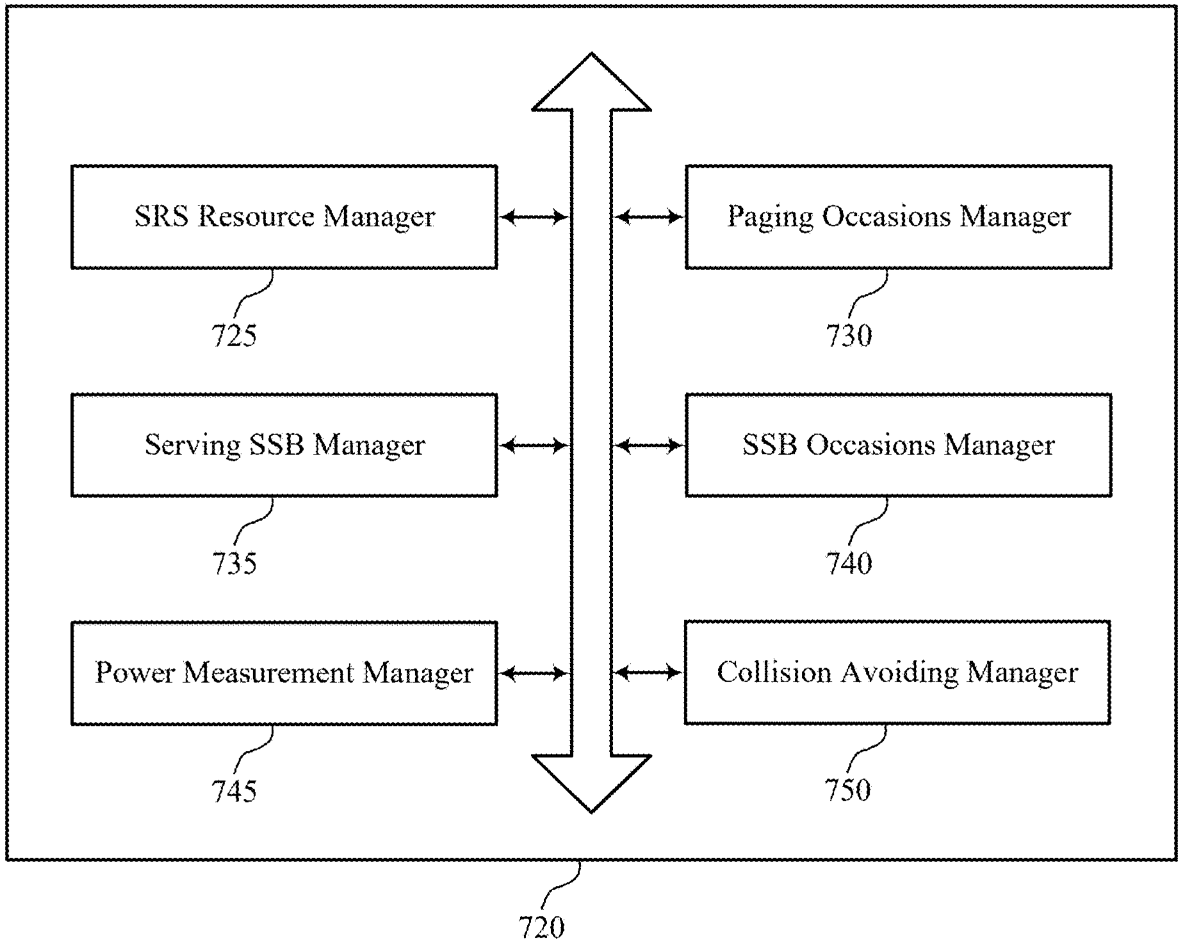
FIG. 7 shows a block diagram of a communications manager that supports techniques for avoiding SRS and paging occasion collisions in accordance with one or more aspects of the present disclosure.

FIG. 7 shows a block diagram 700 of a communications manager 720 that supports techniques for avoiding SRS and paging occasion collisions in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for avoiding SRS and paging occasion collisions as described herein. For example, the communications manager 720 may include an SRS resource manager 725, a paging occasions manager 730, a serving SSB manager 735, an SSB occasions manager 740, a power manager measurement 745, a collision avoidance manager 750, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The SRS resource manager 725 is capable of, configured to, or operable to support a means for receiving first control signaling indicating a set of SRS resources associated with a first subscriber identity associated with the UE. The paging occasions manager 730 is capable of, configured to, or operable to support a means for receiving second control signaling indicating a first set of paging occasions and a set of SSB occasions associated with a second subscriber identity associated with the UE, where a first serving SSB is associated with one of the SSB occasions. The serving SSB manager 735 is capable of, configured to, or operable to support a means for transmitting, in accordance with a scheduling overlap in time between a SRS resource of the set of SRS resources and a paging occasion of the first set of paging occasions, an indication of a transition of the second subscriber identity from the first serving SSB to a second serving SSB.

In some examples, the paging occasions manager 730 is capable of, configured to, or operable to support a means for receiving an indication of a second set of paging occasions based on the second serving SSB, where the second set of paging occasions is different from the first set of paging occasions.

In some examples, the SSB occasions manager 740 is capable of, configured to, or operable to support a means for receiving one or more SSBs in accordance with the set of SSB occasions. In some examples, the power manager measurement 745 is capable of, configured to, or operable to support a means for measuring a received signal power associated with the one or more SSBs, where the indication of the transition of the second subscriber identity from the first serving SSB to the second serving SSB is based on the received signal power.

In some examples, the received signal power includes one or more of a reference signal received power value, a signal to noise ratio, a reference signal received quantity value, or a combination thereof.

In some examples, the indication of the transition of the second subscriber identity from the first serving SSB to the second serving SSB is based on the received signal power satisfying a threshold.

In some examples, the SRS resource manager 725 is capable of, configured to, or operable to support a means for obtaining, from a first wireless modem associated with the first subscriber identity, an indication of the set of SRS resources in accordance with the first control signaling. In some examples, the paging occasions manager 730 is capable of, configured to, or operable to support a means for obtaining, from a second wireless modem associated with the second subscriber identity, an indication of the first set of paging occasions and the received signal power associated with the one or more SSBs. In some examples, the serving SSB manager 735 is capable of, configured to, or operable to support a means for outputting, to the second wireless modem, an index associated with the second serving SSB to trigger the transition of the second subscriber identity from the first SSB to the second SSB.

In some examples, the SRS resource manager 725 is capable of, configured to, or operable to support a means for receiving one or more SRSs in accordance with the set of SRS resources. In some examples, the paging occasions manager 730 is capable of, configured to, or operable to support a means for receiving one or more paging messages in accordance with the second set of paging occasions, where the one or more paging messages are non-overlapping in time with the one or more SRSs.

In some examples, the first subscriber identity includes a DDS of the UE, and the second subscriber identity includes a nDDS service of the UE.

In some examples, the first subscriber identity is associated with a connected state, and the second subscriber identity is associated with an idle state.

In some examples, the indication of the transition of the second subscriber identity from the first serving SSB to a second serving SSB includes one or more of random access message to the network entity in accordance with the second serving SSB, a control message explicitly identifying the second serving SSB, or a combination thereof.

In some examples, the collision avoidance manager 750 is capable of, configured to, or operable to support a means for receiving a SRS configuration of a set of SRS resources of the DDS subscriber. In some examples, the collision avoidance manager 750 is capable of, configured to, or operable to support a means for receiving a SSB configuration and a set of paging occasions of the nDDS subscriber. In some examples, the collision avoidance manager 750 is capable of, configured to, or operable to support a means for identifying whether the set of SRS resources of the DDS subscriber overlap in time with the set of paging occasions of the nDDS subscriber. In some examples, the collision avoidance manager 750 is capable of, configured to, or operable to support a means for identifying a new serving SSB to avoid the overlap between the SRS resources and the paging occasions.

Figure 8:
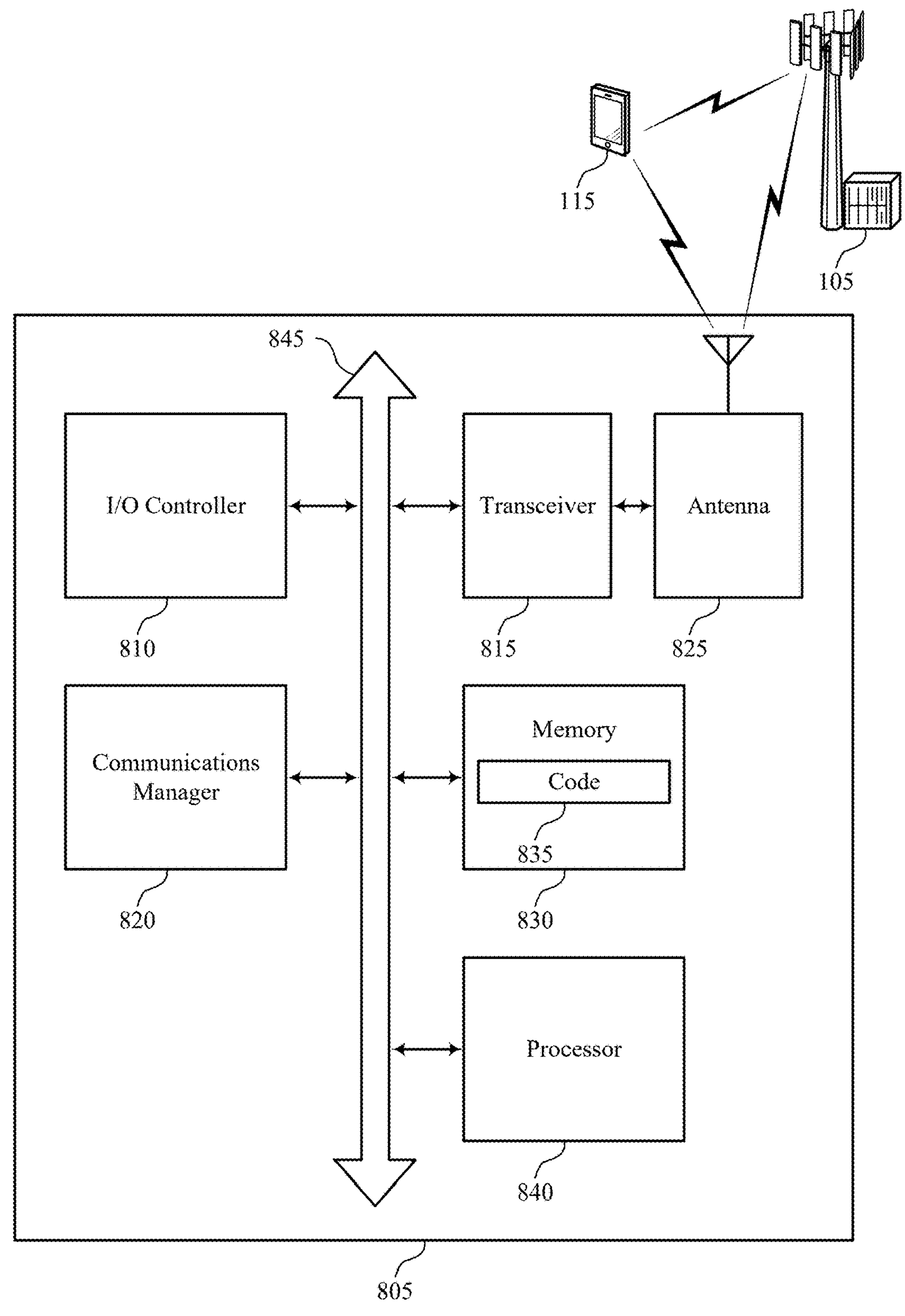
FIG. 8 shows a diagram of a system including a device that supports techniques for avoiding SRS and paging occasion collisions in accordance with one or more aspects of the present disclosure.

FIG. 8 shows a diagram of a system 800 including a device 805 that supports techniques for avoiding SRS and paging occasion collisions in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting techniques for avoiding SRS and paging occasion collisions). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving first control signaling indicating a set of SRS resources associated with a first subscriber identity associated with the UE. The communications manager 820 is capable of, configured to, or operable to support a means for receiving second control signaling indicating a first set of paging occasions and a set of SSB occasions associated with a second subscriber identity associated with the UE, where a first serving SSB is associated with one of the SSB occasions. The communications manager 820 is capable of, configured to, or operable to support a means for transmitting, in accordance with a scheduling overlap in time between a SRS resource of the set of SRS resources and a paging occasion of the first set of paging occasions, an indication of a transition of the second subscriber identity from the first serving SSB to a second serving SSB.

By including or configuring the communications manager 820 in accordance with examples as described herein, the device 805 may support techniques for improved communication reliability, reduced latency, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of techniques for avoiding SRS and paging occasion collisions as described herein, or the at least one processor 840 and the at least one memory 830 may be otherwise configured to, individually or collectively, perform or support such operations.

FIG. 9 shows a flowchart illustrating a method 900 that supports techniques for avoiding SRS and paging occasion collisions in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving first control signaling indicating a set of SRS resources associated with a first subscriber identity associated with the UE. The operations of 905 may be performed in accordance with examples as disclosed herein. In some examples, aspects of the operations of 905 may be performed by an SRS resource manager 725 as described with reference to FIG. 7.

At 910, the method may include receiving second control signaling indicating a first set of paging occasions and a set of SSB occasions associated with a second subscriber identity associated with the UE, where a first serving SSB is associated with one of the SSB occasions. The operations of 910 may be performed in accordance with examples as disclosed herein. In some examples, aspects of the operations of 910 may be performed by a paging occasions manager 730 as described with reference to FIG. 7.

At 915, the method may include transmitting, in accordance with a scheduling overlap in time between a SRS resource of the set of SRS resources and a paging occasion of the first set of paging occasions, an indication of a transition of the second subscriber identity from the first serving SSB to a second serving SSB. The operations of 915 may be performed in accordance with examples as disclosed herein. In some examples, aspects of the operations of 915 may be performed by a serving SSB manager 735 as described with reference to FIG. 7.

Figure 10:
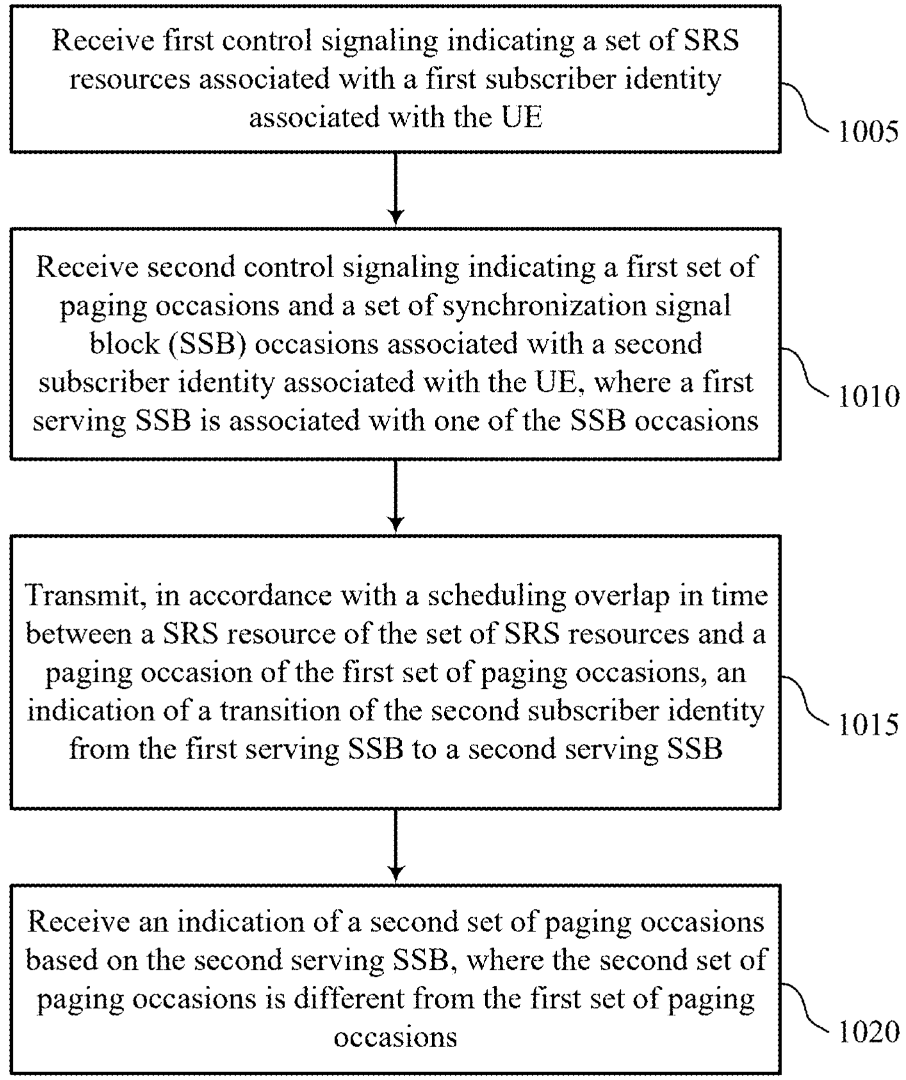

FIG. 10 shows a flowchart illustrating a method 1000 that supports techniques for avoiding SRS and paging occasion collisions in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving first control signaling indicating a set of SRS resources associated with a first subscriber identity associated with the UE. The operations of 1005 may be performed in accordance with examples as disclosed herein. In some examples, aspects of the operations of 1005 may be performed by an SRS resource manager 725 as described with reference to FIG. 7.

At 1010, the method may include receiving second control signaling indicating a first set of paging occasions and a set of SSB occasions associated with a second subscriber identity associated with the UE, where a first serving SSB is associated with one of the SSB occasions. The operations of 1010 may be performed in accordance with examples as disclosed herein. In some examples, aspects of the operations of 1010 may be performed by a paging occasions manager 730 as described with reference to FIG. 7.

At 1015, the method may include transmitting, in accordance with a scheduling overlap in time between a SRS resource of the set of SRS resources and a paging occasion of the first set of paging occasions, an indication of a transition of the second subscriber identity from the first serving SSB to a second serving SSB. The operations of 1015 may be performed in accordance with examples as disclosed herein. In some examples, aspects of the operations of 1015 may be performed by a serving SSB manager 735 as described with reference to FIG. 7.

At 1020, the method may include receiving an indication of a second set of paging occasions based on the second serving SSB, where the second set of paging occasions is different from the first set of paging occasions. The operations of 1020 may be performed in accordance with examples as disclosed herein. In some examples, aspects of the operations of 1020 may be performed by a paging occasions manager 730 as described with reference to FIG. 7.

The following provides an overview of aspects of the present disclosure:

Aspect 1: A method for wireless communication by a UE, comprising: receiving first control signaling indicating a set of SRS resources associated with a first subscriber identity associated with the UE; receiving second control signaling indicating a first set of paging occasions and a set of SSB occasions associated with a second subscriber identity associated with the UE, wherein a first serving SSB is associated with one of the SSB occasions; and transmitting, in accordance with a scheduling overlap in time between a SRS resource of the set of SRS resources and a paging occasion of the first set of paging occasions, an indication of a transition of the second subscriber identity from the first serving SSB to a second serving SSB.

Aspect 2: The method of aspect 1, further comprising: receiving an indication of a second set of paging occasions based at least in part on the second serving SSB, wherein the second set of paging occasions is different from the first set of paging occasions.

Aspect 3: The method of aspect 2, further comprising: receiving one or more SSBs in accordance with the set of SSB occasions; and measuring a received signal power associated with the one or more SSBs, wherein the indication of the transition of the second subscriber identity from the first serving SSB to the second serving SSB is based at least in part on the received signal power.

Aspect 4: The method of aspect 3, wherein the received signal power includes one or more of a reference signal received power value, a signal to noise ratio, a reference signal received quantity value, or a combination thereof.

Aspect 5: The method of any of aspects 3 through 4, wherein the indication of the transition of the second subscriber identity from the first serving SSB to the second serving SSB is based at least in part on the received signal power satisfying a threshold.

Aspect 6: The method of any of aspects 3 through 5, further comprising: obtaining, from a first wireless modem associated with the first subscriber identity, an indication of the set of SRS resources in accordance with the first control signaling; obtaining, from a second wireless modem associated with the second subscriber identity, an indication of the first set of paging occasions and the received signal power associated with the one or more SSBs; and outputting, to the second wireless modem, an index associated with the second serving SSB to trigger the transition of the second subscriber identity from the first SSB to the second SSB.

Aspect 7: The method of any of aspects 2 through 6, further comprising: receiving one or more SRSs in accordance with the set of SRS resources; and receiving one or more paging messages in accordance with the second set of paging occasions, wherein the one or more paging messages are non-overlapping in time with the one or more SRSs.

Aspect 8: The method of any of aspects 1 through 7, wherein the first subscriber identity comprises a DDS of the UE, and the second subscriber identity comprises a nDDS service of the UE.

Aspect 9: The method of any of aspects 1 through 8, wherein the first subscriber identity is associated with a connected state, and the second subscriber identity is associated with an idle state.

Aspect 10: The method of any of aspects 1 through 9, wherein the indication of the transition of the second subscriber identity from the first serving SSB to a second serving SSB includes one or more of a random access message to the network entity in accordance with the second serving SSB, a control message explicitly identifying the second serving SSB, or a combination thereof.

Aspect 11: A UE for wireless communication, comprising one or more memories storing processor-executable code, and one or more processors coupled with the one or more memories and individually or collectively operable to execute the code to cause the UE to perform a method of any of aspects 1 through 10.

Aspect 12: A UE for wireless communication, comprising at least one means for performing a method of any of aspects 1 through 10.

Aspect 13: A non-transitory computer-readable medium storing code for wireless communication, the code comprising instructions executable by one or more processors to perform a method of any of aspects 1 through 10.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive first control signaling indicating a set of sounding reference signal (SRS) resources associated with a first subscriber identity associated with the UE;

receive second control signaling indicating a first set of paging occasions and a set of synchronization signal block (SSB) occasions associated with a second subscriber identity associated with the UE, wherein a first serving SSB is associated with one of the SSB occasions; and transmit, in accordance with a scheduling overlap in time between a SRS resource of the set of SRS resources and a paging occasion of the first set of paging occasions, an indication of a transition of the second subscriber identity from the first serving SSB to a second serving SSB.

2. The UE of claim 1, wherein the one or more processors are individually or collectively further operable to execute the code to cause the UE to:

receive an indication of a second set of paging occasions based at least in part on the second serving SSB, wherein the second set of paging occasions is different from the first set of paging occasions.

3. The UE of claim 2, wherein the one or more processors are individually or collectively further operable to execute the code to cause the UE to:

receive one or more SSBs in accordance with the set of SSB occasions; and measure a received signal power associated with the one or more SSBs, wherein the indication of the transition of the second subscriber identity from the first serving SSB to the second serving SSB is based at least in part on the received signal power.

4. The UE of claim 3, wherein the received signal power includes one or more of a reference signal received power value, a signal to noise ratio, a reference signal received quantity value, or a combination thereof.

5. The UE of claim 3, wherein the indication of the transition of the second subscriber identity from the first serving SSB to the second serving SSB is based at least in part on the received signal power satisfying a threshold.

6. The UE of claim 3, wherein the one or more processors are individually or collectively further operable to execute the code to cause the UE to:

obtain, from a first wireless modem associated with the first subscriber identity, an indication of the set of sounding reference signal (SRS) resources in accordance with the first control signaling;

obtain, from a second wireless modem associated with the second subscriber identity, an indication of the first set of paging occasions and the received signal power associated with the one or more SSBs; and output, to the second wireless modem, an index associated with the second serving SSB to trigger the transition of the second subscriber identity from the first serving SSB to the second serving SSB.

7. The UE of claim 2, wherein the one or more processors are individually or collectively further operable to execute the code to cause the UE to:

receive one or more SRSs in accordance with the set of SRS resources; and receive one or more paging messages in accordance with the second set of paging occasions, wherein the one or more paging messages are non-overlapping in time with the one or more SRSs.

8. The UE of claim 1, wherein the first subscriber identity comprises a dedicated data subscription of the UE, and the second subscriber identity comprises a non-dedicated data subscription service of the UE.

9. The UE of claim 1, wherein the first subscriber identity is associated with a connected state, and the second subscriber identity is associated with an idle state.

10. The UE of claim 1, wherein the indication of the transition of the second subscriber identity from the first serving SSB to a second serving SSB includes one or more of a random access message to a network entity in accordance with the second serving SSB, a control message explicitly identifying the second serving SSB, or a combination thereof.

11. A method for wireless communication by a user equipment (UE), comprising:

receiving first control signaling indicating a set of sounding reference signal (SRS) resources associated with a first subscriber identity associated with the UE;

receiving second control signaling indicating a first set of paging occasions and a set of synchronization signal block (SSB) occasions associated with a second subscriber identity associated with the UE, wherein a first serving SSB is associated with one of the SSB occasions; and transmitting, in accordance with a scheduling overlap in time between a SRS resource of the set of SRS resources and a paging occasion of the first set of paging occasions, an indication of a transition of the second subscriber identity from the first serving SSB to a second serving SSB.

12. The method of claim 11, further comprising:

receiving an indication of a second set of paging occasions based at least in part on the second serving SSB, wherein the second set of paging occasions is different from the first set of paging occasions.

13. The method of claim 12, further comprising:

receiving one or more SSBs in accordance with the set of SSB occasions; and measuring a received signal power associated with the one or more SSBs, wherein the indication of the transition of the second subscriber identity from the first serving SSB to the second serving SSB is based at least in part on the received signal power.

14. The method of claim 13, wherein the received signal power includes one or more of a reference signal received power value, a signal to noise ratio, a reference signal received quantity value, or a combination thereof.

15. The method of claim 13, wherein the indication of the transition of the second subscriber identity from the first serving SSB to the second serving SSB is based at least in part on the received signal power satisfying a threshold.

16. The method of claim 13, further comprising:

obtaining, from a first wireless modem associated with the first subscriber identity, an indication of the set of sounding reference signal (SRS) resources in accordance with the first control signaling;

obtaining, from a second wireless modem associated with the second subscriber identity, an indication of the first set of paging occasions and the received signal power associated with the one or more SSBs; and outputting, to the second wireless modem, an index associated with the second serving SSB to trigger the transition of the second subscriber identity from the first serving SSB to the second serving SSB.

17. The method of claim 12, further comprising:

receiving one or more SRSs in accordance with the set of SRS resources; and receiving one or more paging messages in accordance with the second set of paging occasions, wherein the one or more paging messages are non-overlapping in time with the one or more SRSs.

18. The method of claim 11, wherein the first subscriber identity comprises a dedicated data subscription of the UE, and the second subscriber identity comprises a non-dedicated data subscription service of the UE.

19. The method of claim 11, wherein the first subscriber identity is associated with a connected state, and the second subscriber identity is associated with an idle state.

20. A non-transitory computer-readable medium storing code for wireless communication, the code comprising instructions executable by one or more processors to:

receive first control signaling indicating a set of sounding reference signal (SRS) resources associated with a first subscriber identity associated with a user equipment (UE);

receive second control signaling indicating a first set of paging occasions and a set of synchronization signal block (SSB) occasions associated with a second subscriber identity associated with the UE, wherein a first serving SSB is associated with one of the SSB occasions; and transmit, in accordance with a scheduling overlap in time between a SRS resource of the set of SRS resources and a paging occasion of the first set of paging occasions, an indication of a transition of the second subscriber identity from the first serving SSB to a second serving SSB.

* * * * *